United States Patent [19]

Cortes

[11] Patent Number: 5,760,828
[45] Date of Patent: Jun. 2, 1998

[54] BACK-VISION SYSTEM FOR VEHICLES

[75] Inventor: Luis Leon Lamata Cortes, Badajoz, Spain

[73] Assignee: Idesa Accesorios, S.A., Barcelona, Spain

[21] Appl. No.: 592,386

[22] PCT Filed: Jun. 2, 1995

[86] PCT No.: PCT/ES95/00068

§ 371 Date: Apr. 9, 1996

§ 102(e) Date: Apr. 9, 1996

[87] PCT Pub. No.: WO95/33634

PCT Pub. Date: Dec. 14, 1995

[30] Foreign Application Priority Data

Jun. 3, 1994 [ES] Spain ............................ 9401265 U

[51] Int. Cl.⁶ .................................................. H04N 7/18
[52] U.S. Cl. ...................... 348/143; 348/148; 348/151
[58] Field of Search .................................. 348/143, 148, 348/151, 118, 117; 340/435, 436, 901; 359/871

[56] References Cited

U.S. PATENT DOCUMENTS

| 4,789,904 | 12/1988 | Peterson | 358/310 |
| 4,843,463 | 6/1989 | Michetti | 358/108 |
| 4,964,712 | 10/1990 | Anderson | 350/615 |
| 5,027,200 | 6/1991 | Petrossian et al. | 358/103 |
| 5,111,289 | 5/1992 | Lucas et al. | 358/108 |
| 5,121,200 | 6/1992 | Choi | 358/103 |
| 5,243,417 | 9/1993 | Pollard | 358/103 |
| 5,264,962 | 11/1993 | Kho | 359/362 |
| 5,289,321 | 2/1994 | Secor | 359/896 |
| 5,574,443 | 11/1996 | Hsieh | 340/901 |
| 5,642,238 | 6/1997 | Sala | 359/871 |
| 5,670,935 | 9/1997 | Schofield et al. | 340/461 |

FOREIGN PATENT DOCUMENTS

| 691926 | of 0000 | Belgium . |
| 0152181 | of 0000 | European Pat. Off. . |
| 2672857 | of 0000 | France . |
| 2673499 | of 0000 | France . |
| 03273953 | of 0000 | Japan . |
| 06171425 | of 0000 | Japan . |
| 60259543 | of 0000 | Japan . |
| 62159590 | of 0000 | Japan . |

OTHER PUBLICATIONS

Patent Abstracts of Japan, vol. 16, No. 94 (M-1219) 9 Mar. 1992.
Patent Abstracts of Japan, vol. 11, No. 400 (E-569) 26 Dec. 1987.
Patent Abstracts of Japan, vol. 10, No. 134 (M-479) 17 May 1986.
Patent Abstracts of Japan, vol. 18, No. 503 (M-1677) 21 Sep. 1994.

Primary Examiner—Tommy P. Chin
Assistant Examiner—Anand Rao
Attorney, Agent, or Firm—Ladas & Parry

[57] ABSTRACT

Back-vision system for vehicles which comprises a microcamera (6) with its corresponding control unit (13) and power-supply source, a housing for the microcamera (6), formed by an external casing (1) and an internal box (2) joined to the external casing (1) and in communication with it, into which the microcamera (6) is introduced, the objective of which microcamera is focused towards the outside through an opening in the external casing (1), and a monitor (21) on which the images picked up by the microcamera (6) can be seen. By placing a microcamera (6) in its corresponding housing in a suitable manner on one of the sides of the vehicle and, optionally one microcamera and its housing on each side, improved back-vision is obtained.

6 Claims, 2 Drawing Sheets

5,760,828

BACK-VISION SYSTEM FOR VEHICLES

SUBJECT OF THE INVENTION

The present invention relates to a novel external back-vision system for motor vehicles of all types, such as cars, trucks, buses, caravans, etc., and including, in addition, competition vehicles.

BACKGROUND OF THE INVENTION

External rear-view mirrors of the state of the art involve a number of limitations which reduce and even cancel out the necessary periodical information which the driver requires of them. Such drawbacks are the existence of a blindspot in which vision is impossible; non-operation of the mirrors in rainy weather; loss of the necessary front vision when looking in the mirrors; vulnerability to changes in adjustment or breakages caused by acts of vandalism, accidents and the like; dazzling caused by the headlamps of following vehicles at night or by the sun in certain situations such as, for example, when driving away from the sun at dusk; parking difficulties caused by the lack of reference to the ground; difficulties in looking in the mirrors on account of trailers and caravans during certain maneuvers; and, finally, the aerodynamic resistance which external rearview mirrors cause and which, to a greater or lesser degree, translates into an increase in fuel consumption.

Many of these drawbacks are exacerbated in the case of competition vehicles, particularly in respect of the blindspot, speed of looking in the mirror, nonoperation in adverse weather conditions and the resistance which conventional rear-view mirrors offer to forward progress. In connection with this latter aspect, it must be taken into account that the aerodynamic resistance increases with the square of the velocity and, therefore, in vehicles moving at over 300 km/h, such as F-1s, prototypes, etc., the rear-view mirrors account for a considerable resistance to forward progress which translates into lower speed and greater consumption.

There are known video cameras in the state of the art which make it possible to pick up images and sound and to store them on a tape for subsequent reproduction on monitors or television screens or, alternatively, to display what is being filmed at the very instant this is taking place. With the development of the technology and for specific purposes, models of cameras have been developed which are smaller in size than traditional cameras but which, nevertheless, offer the same levels of performance: these are known as microcameras and are intended for very different uses, including, in particular, security (CCTV), medicine, observing nature, sports broadcasts and other shots in locations with limited access. However, to date, no use has been found for them in the field of back-vision in vehicles nor, of course, have the problems involved in such an application been solved.

DESCRIPTION OF THE INVENTION

All the drawbacks mentioned above are totally or at least very substantially eliminated with the rear-view system for vehicles of the present invention, which takes advantage of the potential of video cameras for back-vision in motor vehicles.

The present invention therefore relates to a back-vision system for vehicles, which comprises a microcamera, its control unit, the corresponding monitor and the housing for the microcamera which is composed of the assembly formed by an external casing with an opening to permit focusing of the objective of the microcamera and an internal box in communication with said external casing and open, in a preferred embodiment, on the side opposite it to allow the introduction of the microcamera. This assembly is finished off, in a preferred embodiment, by a cover which enables the internal box to be closed on the side opposite the external casing and, in addition, a glass pane to be fitted in the closure of the said opening. Preferably, the space around the microcamera, inside the assembly formed by the external casing and the internal box, is filled with an insulating material and, as has just been pointed out, the opening of the external casing is closed by means of a glass pane for protecting the microcamera. All the aforesaid elements form a system which permits back vision on one of the sides of the vehicle. However, a second external casing may be installed on the opposite side of the vehicle together with, as appropriate, a second glass pane, a second internal box, a second microcamera, a second cover and a second control unit for the second microcamera, so as to enjoy visibility on this second side also. In this case, the same monitor may be used to receive the images from both microcameras or, alternatively, two monitors may be installed.

BRIEF DESCRIPTION OF THE DRAWINGS

The present invention will be better understood with reference to the appended drawings, in which.

DESCRIPTION OF A PREFERRED EMBODIMENT

Figure 1:
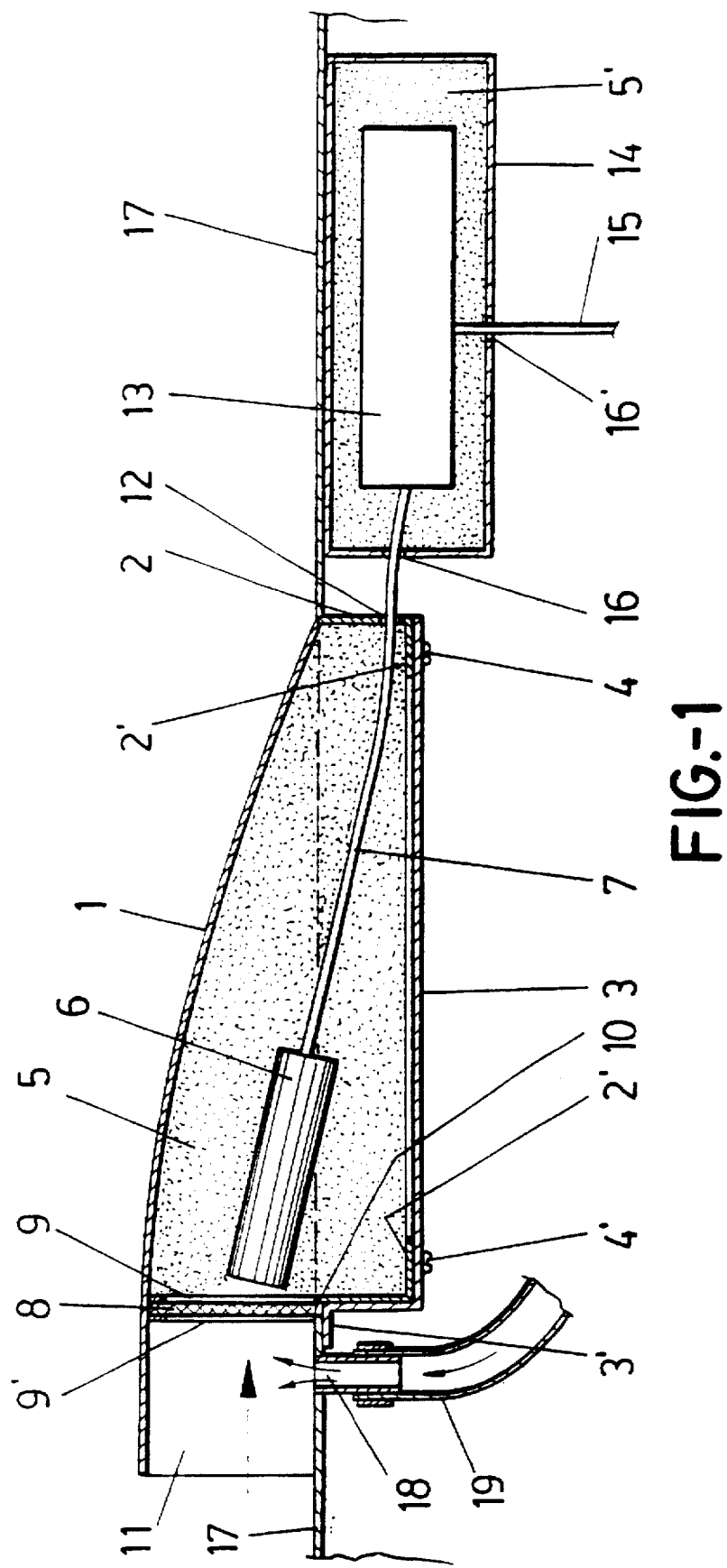
FIG. 1 shows a plan view of a longitudinal section of the housing of the microcamera in one embodiment of the present invention, with the microcamera installed in it and the cover which finishes it off fitted, as well as of the housing of the control unit of said microcamera.
Figure 2:
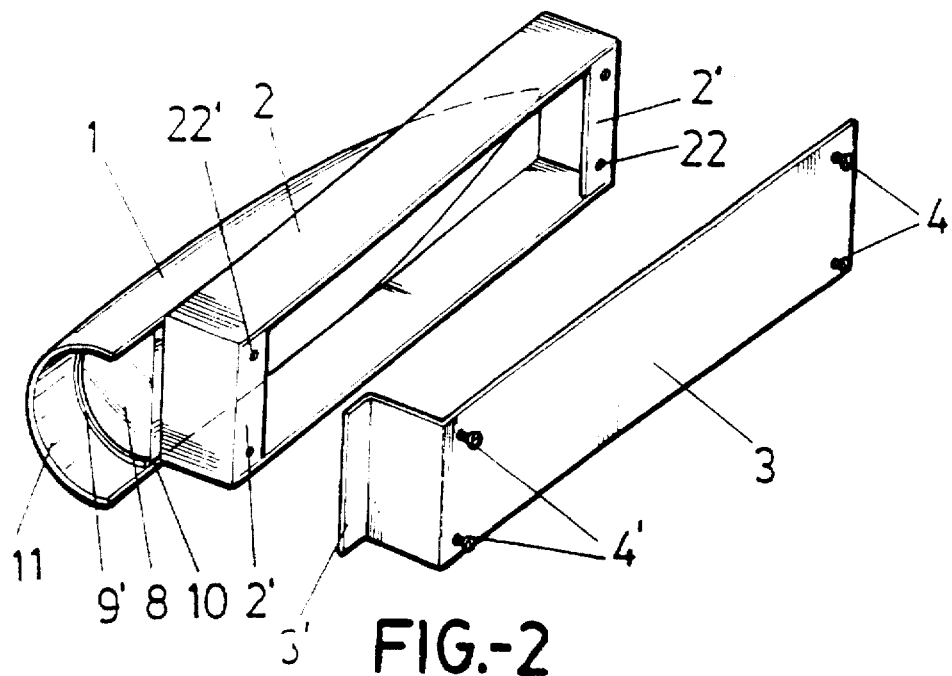
FIG. 2 shows a perspective view of the housing of the microcamera, which is still not fitted.
Figure 3:
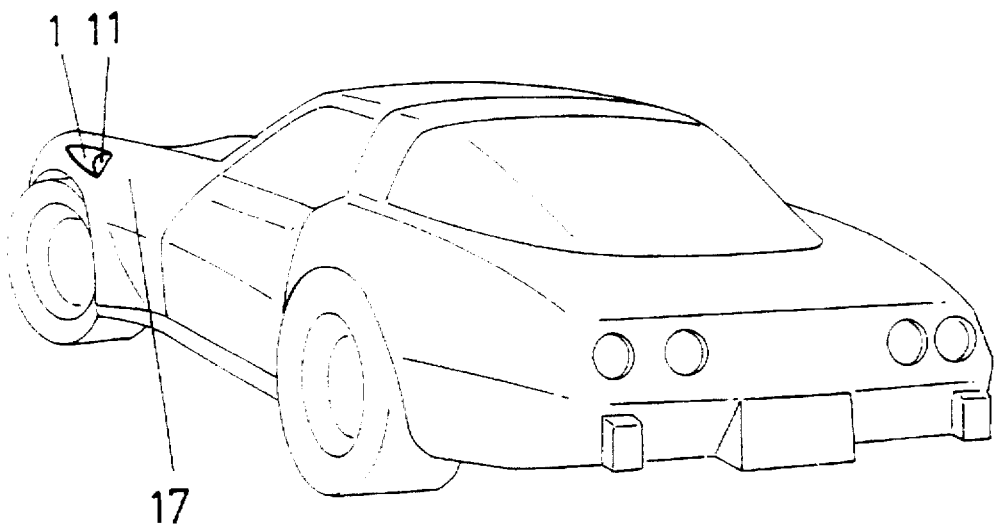
FIG. 3 shows a side, perspective view of a vehicle with the back-vision system of the present invention installed.

FIGS. 1, 2 and 3 of the drawings show the housing of the microcamera corresponding to the left hand side of the vehicle. It will easily be understood that the back-vision system for vehicles of the present invention is equally applicable to the right hand side of the vehicle and the detailed description of the preferred embodiment of the present invention which is given below is valid both for a situation in which the housing for the microcamera is placed on the left hand side of the vehicle and for a situation in which it is placed on the right.

In a preferred embodiment of the back-vision system for vehicles of the present invention, and as illustrated in FIG. 1, a microcamera (6) is housed inside an assembly formed by an external casing (1) and an internal box (2) joined to the external casing (1) and open on the side on which it is joined to the casing.

The external casing (1) has an aerodynamic shape and is joined to the lateral surface (17) of the body of the vehicle or, alternatively, forms an integral part of the body. Preferably, the position of the external casing (1) will correspond to the front upper lateral zone of the body of the vehicle (front left fender) as shown in FIG. 3, in a position which is somewhat further forward, therefore, than conventional external rear-view mirrors. The assembly formed by the external casing (1) and the internal box (2) is finished off by means of a cover (3). This cover (3) closes the internal box (2) on its side opposite the side which is open towards the external casing (1), thereby permitting the introduction of the microcamera (6). The cover (3) is secured by means of pairs of self-tapping screws (4), (4') to the corresponding orifices (22), (22') provided on individual lugs (2') with which the internal box (2) is equipped, as may be seen in FIGS. 1 and 2.

The internal box (2), which is of a size somewhat larger than the external casing, is fixed, preferably by means of welding, to the internal part of the sheet metal of the front upper zone of the body of the vehicle (front left fender), as may be observed particularly in FIG. 1.

The external casing (1) has an opening which receives a glass pane (8) which closes it, as may be seen specifically in FIGS. 1 and 2. Preferably, said glass pane (8) will be heat-shielded, that is to say a glass pane which is insulating with respect to the outside temperature and with a breaking strength which is greater than that of non-shielded normal glass panes. To enable the glass pane (8) to be received, in the embodiment in FIGS. 1 and 2 provision has been made in the external casing (1) for guides (9), (9'), between which a groove (10) is formed, into which the glass pane (8) is introduced. The guide (9) is in the position of the external casing (1) which corresponds to the limit of the internal box (2) which forms the lower part of the opening of the external casing (1), whilst the guide (9') is located in the extension of the external casing (1), in the position which corresponds to the flange (3') of the cover (3), which is used to secure the glass pane (8). The opening of the external casing (1) is extended beyond the glass pane (8), forming a window (11) to protect it against bad weather.

As may be seen in FIG. 1, the microcamera (6) is placed inside the assembly formed by the external casing (1) and the internal box (2) so that its objective focuses towards the rear part of the vehicle, outwards in a slightly oblique manner, through the glass pane (8) and the window (11) to take maximum advantage of the angle covered by the objective and, therefore, to further increase the lateral field of view, thereby reducing the blindspot.

The space formed around the microcamera (6) and its corresponding cable (7), inside the assembly made up by the external casing (1) and the internal box (2) and closed by the glass pane (8), is filled with an insulating material (5), such as soft rubber or silicone, which protects the microcamera (6) against vibrations, extreme temperatures, changes in adjustment and breakages. Said insulating material (5) may be moulded into two parts which fill up the internal space of the assembly formed by the external casing (1) and the internal box (2) and closed by the glass pane (8) and the cover (3), the microcamera (6) with its corresponding cable (7) being introduced into a hollow provided for this purpose between said parts of insulating material (5) so that the latter can adapt totally to the outer shape of the microcamera (6) and its cable (7), except for the part corresponding to the objective, to permit focusing and back vision. The insulating material (5) moulded in this way is inserted into the internal space defined by the assembly formed by the external casing (1) and the internal box (2), before the cover (3) is fitted. However, other ways of introducing the insulating material (5) into said space are conceivable (for example, it may be injected into it).

As may be seen in FIG. 1, in the zone of the lateral surface (17) of the vehicle which corresponds to the external part of the glass pane (8), in the part opposite the end of the external casing (1) which defines the window (11), provision has been made for an orifice (18) which constitutes the outlet for a heating tube (19) connected to the main heating system of the vehicle (not shown). Consequently, the heating system of the back-vision system for vehicles in this embodiment of the present invention will begin to operate when the main heating system of the vehicle is activated. However, other heating systems are also possible (for example, an electric resistance element provided for this purpose in the glass pane (8)).

The control unit (13) of the microcamera (6), which fulfils the functions of powering the microcamera (6) and sending the signal generated by the latter to the monitor (21), will preferably be introduced into a box (14), with appropriately sealed closure, the space between the control unit (13) and the cables (7) and (15) and the internal faces of the box (14) being filled with an insulating material (5') which may also be of the same type as the insulating material (5) described previously, placed in a similar manner. Given its small size, the control unit (13), with its respective box (14) as appropriate, may be housed in any of the many vacant sites which are found on the vehicle and preferably in the internal part of the wing of the vehicle, on whose external part the external casing (1) is placed, next to the internal box (2) and its corresponding cover (3) since there is sufficient space at this site to place all these elements.

The connection between the microcamera (6) and its control unit (13) takes place by means of the cable (7) and is facilitated by means of the orifices (12) and (16) made in the internal box (2) and in the box (14) which protects the control unit (13), respectively. This box (14) for protecting the control unit (13) may be secured by means of any conventional fixing means and preferably by means of welding to the sheet metal of the vehicle on the internal part of the wing.

The power-supply source for the control unit (13) of the microcamera (6) may be the actual vehicle battery (not shown), suitably connected to said control unit (13), it also being possible for the power-supply system to be protected against short-circuits by means of the introduction of a fuse into the power-supply cable (15) which is connected to the control unit (13) in the box (14), penetrating inside the latter through the orifice (16'). The entire system will preferably be actuated by means of the ignition key (20) of the vehicle (FIG. 4), so that actuation of the system is automatic, thereby making it invulnerable to forgetfulness or distractions. However, it may also be connected by means of a switch for this purpose on the dashboard of the vehicle.

Figure 4:
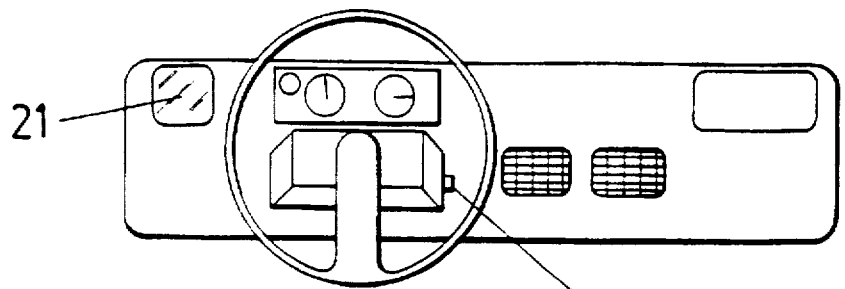
FIG. 4 shows a view of the dashboard of a vehicle equipped with the back-vision system of the present invention.

As shown in FIG. 4, the monitor (21) will be placed inside the vehicle, on the dashboard, facing the driver as far as possible, to make it easy to view it, and will be equipped with locating accessories which fulfil the insulating functions of safety or protection which are required to protect the monitor against extreme temperatures, vibrations, possible knocks and other eventualities.

As has been indicated, if the back-vision system for vehicles of the present invention is applied to obtain back-vision information on both sides of the vehicle, it is possible either to install two monitors (for example, on the dashboard, on both sides of the steering wheel, facing the driver as far as possible), each one of which will provide the images from one side, or a single monitor whose screen may be divided into image sectors, each showing the images from one side.

The above description must be regarded as illustrative and non-limiting. Experts in the art will devise other embodiments of the present invention without departing from the scope thereof. It is therefore essential to take the attached claims into account when determining the scope of the present invention.

I claim:

1. A back-vision system for a vehicle comprising:

a rear facing microcamera for obtaining optical images external to the vehicle and converting said optical images to image signals;

a housing assembly for said microcamera including an external casing adapted for positioning at a first surface of said vehicle and having an opening through which said microcamera can obtain the optical images, an internal portion adapted for positioning within the vehicle and connected to said external casing to form a chamber within said housing assembly, a block of insulative material securely supporting said microcamera at an angle in said chamber for viewing through said opening, said block filling said chamber to hold said microcamera in fixed position in said chamber, said microcamera having an objective lens facing said opening in the external casing, a pane of high strength, tempered glass in said opening in said external casing to cover said objective lens of said microcamera, said external casing including a protective extension extending beyond said pane of glass, means for supplying heat, within said extension adjacent to said pane of glass, said means for supplying heat within said extension comprising an inlet into said extension and a tube connected to said inlet to supply heated air thereto from a heating system of the vehicle, a control unit connected to said microcamera for controlling operation thereof, said control unit being connected to said microcamera to supply power thereto and to receive image signals therefrom;

a separate housing for said control unit adapted for positioning within said vehicle adjacent to said housing assembly for said microcamera, and a further block of insulative material filling said separate housing to hold said control unit in fixed position therein, a power supply unit for supplying power to said control unit, and a monitor for receiving signals from said control unit to display images of back vision produced by said microcamera.

2. A system as claimed in claim 1, wherein said internal portion of said housing assembly has an open bottom and said housing assembly further comprises a cover detachably connected to said internal portion to close said open bottom.

3. A system as claimed in claim 1, wherein said external casing has an aerodynamic shape.

4. A system as claimed in claim 1, wherein said monitor is supported within a cabin of the vehicle to face a driver thereof.

5. A system as claimed in claim 1, wherein said power supply unit is actuated upon insertion of a key into an ignition opening in the vehicle.

6. A system as claimed in claim 1, further comprising:

a second said microcamera, a second said housing assembly, a second said control unit and associated housing, and a second said monitor to provide a separate image produced by said second microcamera.

* * * * *